June 30, 1959 G. J. YOUNG 2,892,765
NEUTRON DENSITY CONTROL IN A NEUTRONIC REACTOR
Filed Feb. 21, 1946 3 Sheets-Sheet 1

Witnesses:
Herbert E. Metcalf
Richard E. Burn

Inventor:
Gale J. Young
By: Robert A. [Saunders]
Attorney

June 30, 1959  G. J. YOUNG  2,892,765
NEUTRON DENSITY CONTROL IN A NEUTRONIC REACTOR
Filed Feb. 21, 1946  3 Sheets-Sheet 2

June 30, 1959 G. J. YOUNG 2,892,765
NEUTRON DENSITY CONTROL IN A NEUTRONIC REACTOR
Filed Feb. 21, 1946 3 Sheets-Sheet 3

Inventor:
Gale J. Young
By:
Attorney

United States Patent Office 2,892,765
Patented June 30, 1959

2,892,765

NEUTRON DENSITY CONTROL IN A NEUTRONIC REACTOR

Gale J. Young, Chicago, Ill., assignor to the United States of America as represented by the United States Atomic Energy Commission Application February 21, 1946, Serial No. 649,398

2 Claims. (Cl. 204—154.2)

The present invention relates to a device of primary use for the production of the transuranic element $94^{239}$ by neutrons released during a self-sustaining nuclear chain reaction through fission of uranium with slow neutrons. Such a device, which is usually called a neutronic reactor is more fully described in the co-pending application of Enrico Fermi and Leo Szilard, Serial No. 568,904, filed December 19, 1944, now Patent No. 2,708,656, dated May 17, 1955. Natural uranium may be used in the reaction and contains the isotopes $92^{238}$ and $92^{235}$ in the ratio of approximately 139 to 1. Hereinafter in the specification and the claims the term uranium is to be understood as referring to uranium and its chemical compositions of normal isotopic content, unless otherwise indicated by the context.

In a self-sustaining chain reaction of uranium with slow neutrons $92^{238}$ is converted by neutron capture to the isotope $92^{239}$. The latter is converted by beta decay to $93^{239}$ and this $93^{239}$ in turn is converted by beta decay to the transuranic element $94^{239}$. By thermal neutron capture, $92^{235}$ on the other hand, undergoes nuclear fission to release energy appearing as heat, gamma and beta radiation, together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in condition to cause slow neutron fission in other $92^{235}$ nuclei. While some of the secondary neutrons are absorbed by the uranium isotope $92^{238}$ leading to the production of $94^{239}$, and by other materials, enough can remain to sustain the chain reaction.

Under these conditions, the chain reaction will supply not only the neutrons necessary for maintaining the neutronic reaction, but also will supply the neutrons for capture by the isotope $92^{238}$ leading to the production of $94^{239}$.

As $94^{239}$ is a transuranic element, it can be separated from the unconverted uranium by chemical methods, and as it is fissionable in a manner similar to the isotope $92^{235}$, it is valuable for enriching natural uranium for use in other chain reaction systems of smaller overall size. The fission fragments are also valuable as sources of radioactivity.

The ratio of the number of secondary neutrons produced by the fissions to the original number of primary neutrons producing the fissions in a chain reacting system of infinite size using specific materials is called the reproduction factor of the system and is denoted by the symbol K. When K is made sufficiently greater than unity to create a net gain in neutrons and the system is of a size that this gain is not entirely lost by leakage from the exterior surface of the system, then a practical self-sustaining chain reacting system producing power by nuclear fission of natural uranium is obtained. The neutron reproduction ratio in a system of finite size differs from K by the exterior neutron leakage factor, and must still be sufficiently greater than unity to permit the neutron density to rise exponentially. Such rise will continue indefinitely if not controlled at a density corresponding to a desired power output.

To more fully understand the operation of a uranium neutronic reactor, the following brief explanation is given. During the interchange of neutrons in a system comprising bodies of uranium of any size disposed in a slowing medium or moderator, neutrons may be lost in four ways; by absorption in the uranium metal or compound, by absorption in the slowing down material or moderator, by absorption in impurities present in the system, and by leakage out of the system. The neutrons which are not lost by one of the above methods are available for fission of $U^{235}$ which produces more neutrons. In general, several neutrons are produced for each fission and consequently sufficient neutrons are produced to make up for the neutrons lost and those consumed by the fission of $U^{235}$.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates a nucleus $92^{239}$ which decays as previously described. It is not to be confused with absorption or capture of neutrons by impurities, referred to later. Neutron resonance absorption in uranium may take place either on the surface of the uranium bodies in which case the absorption is known as surface resonance absorption, or it may take place further in the interior of the uranium body, in which case the absorption is known as volume resonance absorption. Volume resonance absorption is due to the fact that some neutrons make collisions inside the uranium body and may thus arrive at resonance energies therein. After successfully reaching thermal energies, about 40 percent of the neutrons are also subject to capture by $U^{238}$ without fission, leading to the production of $94^{239}$.

It is possible by proper physical arrangement of the materials in the moderator to control the amount of uranium resonance absorption. By the use of a light element such as graphite, relatively few collisions are required to slow the neutrons to thermal energies, thus decreasing the probability of a neutron being at a resonance energy as it enters a uranium atom. During the moderating process, however, neutrons are diffusing through the slowing medium over random paths and distances so that the uranium is not only exposed to thermal neutrons but also to neutrons of energies varying between the energy of fission and thermal energy. Neutrons at uranium resonance energies will, if they enter uranium at these energies, be absorbed on the surface of a uranium body whatever its size, giving rise to surface absorption. Any substantial change of overall surface of the same amount of uranium will change surface resonance absorption. Thus, the volume ratio of moderator to uranium will control resonance absorption losses of neutrons in the uranium, and this fact can be utilized to change the K factor of the reactor. The uranium may be placed in the system in the form of spaced uranium masses or bodies of substantial size, either of metal, oxide, carbide, or combinations thereof. The uranium bodies may be in the form of layers, rods or cylinders, cubes or spheres, or approximate shapes, dispersed throughout the graphite, preferably in some geometric pattern. The term geometric is used to mean any pattern or arrangement wherein the uranium bodies are distributed in the graphite with at least a roughly uniform spacing or with a roughly uniform size and shape or are systematic in variations of size or shape to produce a volume pattern conforming to a generally symmetrical system. If the pattern is a repeating or rather exactly regular one, the structure may be conveniently described as a lattice. Optimum conditions are obtained when natural uranium is used as metal spheres, but short cylinders are substantially equivalent.

The K factor of a mixture of fine uranium particles in graphite, assuming both of them to be theoretically pure, has been valculated to be about .785. Actual K factors as high as 1.07 have been obtained using aggregations of natural uranium into bodies of substantial size dispersed in moderators in various geometries, and with as pure materials as is presently possible to obtain.

The thermal neutrons are also subject to capture by the moderator. While carbon has a relatively low capsure cross-section for thermal neutrons an appreciable fraction of thermal neutrons (about 10 percent of the neutrons present in the system under best conditions with graphite) is lost by capture in the moderator during diffusion therethrough. This means that when volume ratios are changed, the absorption in the moderator will also be changed, as the neutrons will have path lengths varying, before entering uranium, in accordance with the volume ratio used, and the longer time the neutrons remain in the graphite, the higher the probability will be that they will be captured by the moderator.

All materials present in a uranium reactor except the pure uranium and the pure moderator are classed as impurities. The materials which make up these impurities all absorb neutrons in varying degrees. Since any neutron absorbed by the impurities is lost to the chain reaction, any variation in the impurities present in a neutronic reactor will affect the K factor and thus by placing more or less impurities in different zones of the lattice, the K factor for each zone may be adjusted.

The effect of impurities on the optimum reproduction factor K may be conveniently evaluated to a good approximation, simply by means of certain constants known as "danger coefficients" which are assigned to the various elements. These danger coefficients for the impurities are each multiplied by the fraction by weight of the corresponding impurity, and the total sum of these products gives a value known as the total danger sum. This total danger sum is subtracted from the reproduction factor K as calculated for pure materials and for the specific geometry under consideration.

The danger coefficients are defined in terms of the ratio of the weight of impurity per unit mass of uranium and are based on the cross section for absorption of thermal neutrons of the various elements. These values may be obtained from published literature on the subject and the danger coefficient computed by the formula $$\frac{P_i}{P_u} \cdot \frac{A_i}{A_u}$$

wherein $P_i$ represents the cross section for the impurity and $P_u$ the cross section for the uranium, $A_i$ the atomic weight of the impurity and $A_u$ the atomic weight for uranium. If the impurities are in the carbon, they are computed as their percent of the weight of the uranium of the system.

Presently known values for danger coefficients for some elements that may be used in a reactor are given in the following table, wherein the elements are assumed to have their natural isotopic constitution unless otherwise indicated, and are conveniently listed according to their chemical symbols:

| Element: | Danger Coefficient |
|---|---|
| H | 10 |
| D | 0.1 |
| He | 0 |
| Be | 0.04 |
| B | 2150 |
| C | 0.012 |
| N | 4.0 |
| O | 0.002 |
| Al | 0.30 |
| Fe | 1.5 |
| Cd | 760 |

The neutronic chain reaction referred to can be made self-sustaining in a device known as a neutronic reactor wherein uranium bodies are dispersed in an efficient neutron slowing medium or moderator, when the reactor is made to be just above a critical size where the rate of neutron generation inside the reactor is slightly greater than the rate of neutron loss. Under these conditions, a self-sustaining nuclear chain reaction can be obtained within the reactor having any neutron density desired. However, to prevent destruction of the reactor, the heat of the reaction must be controlled, and then removed by an amount providing a stable temperature in the reactor at some predetermined and controlled operating level. As the greater the number of fissions, the greater the number of neutrons are present to produce $92^{239}$, converting to $94^{239}$ is accelerated by operating the reactor at high neutron density levels.

A stable temperature in an uncoiled neutronic reactor composed entirely of moderator and thermally fissionable material such as, for example, graphite and uranium metal, can only be attained at a relatively low power output as the heat generated can be dissipated only by conduction out of the reactor. Higher power outputs with greater production $94^{239}$ require additional heat removal such as by circulation of a fluid.

However, proper heat removal is complicated by the fact that in a neutronic reactor where the uranium bodies are in a lattice of uniform size and spacing, and where the impurities are also uniformly spaced, nuclear fission and heat generation due to the chain reaction are both greatest at the center of the reactor and least at its edges, both activities following an approximate cosine curve distribution from the center to the edge of the reactor, as will be pointed out later. Such a centrally peaked activity limits the total power at which the reactor can operate, to a power where the more central uranium bodies are operating at a maximum permissible temperature. In other words, the temperature of the uranium at the center of the reactor is a controlling factor. The total power output, under these circumstances, can therefore be only the average power developed in the reactor when the uranium at the center of the reactor has reached the maximum permissible temperature. If, however, the reactor activity curve can be flattened across the reactor, then the central peak power can still remain at the maximum permissible value and the total power output of the reactor can be increased. One method of flattening this activity curve is described in the copending application of Gale J. Young, Serial No. 552,730, filed September 5, 1944, now Patent No. 2,774,730, dated December 18, 1956.

It will be understood that the choice of fissionable and moderator materials, the pattern of distribution of the fissionable material in the moderator, the critical size of the reactive composition comprising fissionable material and moderator required to maintain the self-sustaining reaction, and the means employed to remove the heat generated in the reaction in themselves constitute no part of the present invention, being now known to persons skilled in the art, as exemplified in the above-mentioned copending application. It will be further understood that the term "thermally fissionable" means as is common in the art, fissionable by thermal neutrons, and that a neutron absorber is a material which absorbs neutrons without contributing any substantial number of neutrons to the reaction.

It is the principal object of the invention to so design a cooled neutronic reactor that the maximum heat generation due to nuclear fission is spread out over a large volume of the reactor so that operating power can be increased without excessive deterioration from heat.

Flattening of the reactor activity curve across the reactor is also advantageous in that the local heat generation is directly proportional to the local absorption of neutrons by $U^{238}$. In other words $94^{239}$ will eventually be formed in the uranium bodies in accordance with the neutron density to which the bodies are exposed. Flattening the reactor activity curve across the reactor will permit a greater number of uranium bodies to be subjected to high neutron densities.

As impurity content can control the K factor of a reactor structure, lattices having different impurity content can provide different K factors in a neutronic reactor. Ordinarily, neutronic reactors have lattices in which uranium bodies of uniform size and shape and purity are placed in the moderator with uniform spacing throughout, the bodies are generally of substantially uniform size, and uniform volumes of coolant are used. This results in the absence of compensating factors in a reactor having a peaked central neutron density, and in consequence, a peaked central heat production.

However, by using lattices having different amounts of impurities in different concentric zones of the reactor, and particularly by positioning impurities to give the lowest K factor in the center zone of the reactor, the reactor activity curve can be appreciably flattened across the reactor, resulting for the same total power, in lowering the relative central peak neutron density and in raising the neutron density in outer zones. In consequence, the activity is spread more uniformly throughout the reactor. Cooling becomes more efficient and when the central uranium bodies are raised to their maximum permissible operating temperature, the total power output of the reactor with a flattened activity curve across the reactor is increased for the same central uranium body temperature. The amount of uranium exposed to high neutron densities is increased, and the yield of $94^{239}$ is hereby increased. By proper flattening of the activity curve the overall power of a reactor may be increased as much as 35 percent.

The impurities may be applied and varied throughout the reactor by several methods. This invention relates to varying said impurities by means of members composed of or containing said impurities, which may be inserted or withdrawn from the reactor at will.

It is, therefore, another object of the invention to provide a novel method and apparatus for adjusting the neutron activity so that the neutron activity curve may be changed at any time even when the reactor is operating.

Other objects and advantages of the invention may be more clearly understood by reference to the following description and the attached drawings which illustrate, as an example, one form of a reactor in which the invention may be used. This example of a uranium-graphite, air-cooled reactor is not to be taken as limiting, as the invention, within the scope of the appended claims, can be used in any type of neutronic reactor wherein uranium bodies or other fissionable bodies are disposed in a moderator.

Figure 1:
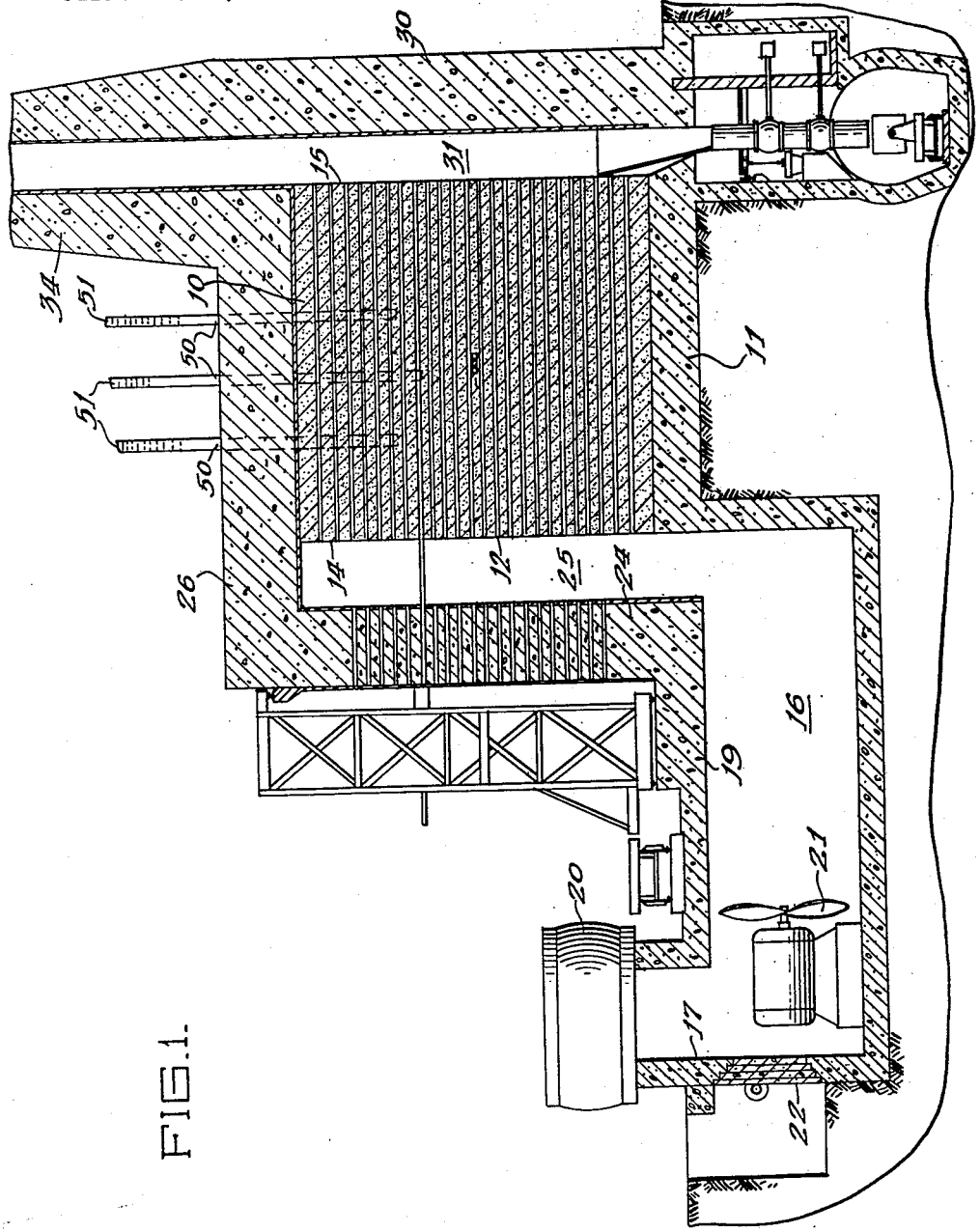
Fig. 1 is a diagrammatic longitudinal vertical sectional view partly in elevation, of an air cooled neutronic reactor system illustrating the invention.

Referring to the drawings, the invention is illustrated by reference to an air cooled graphite uranium reactor, sometimes known as a pile, first described as loaded in accordance with uniformly spaced rod geometry to give a normal peaked activity curve. Then follows a description on how the same structure can be loaded to flatten the activity curve.

Figure 2:
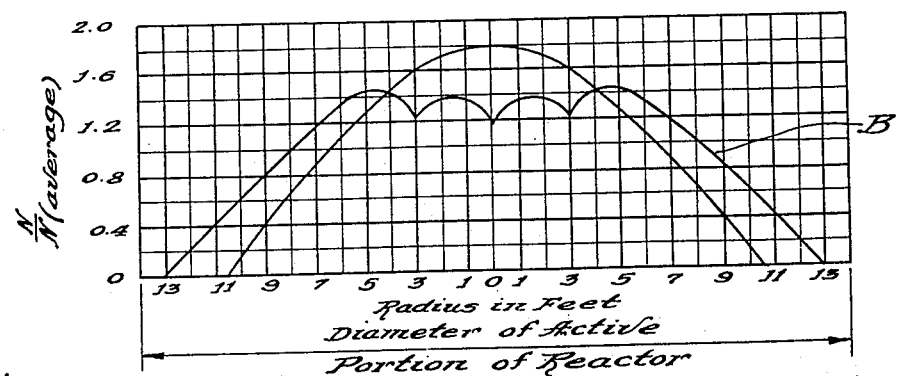
Fig. 2 is a graph showing the relative neutron densities across the reactor, both with and without the application of the present invention.
Figure 5:
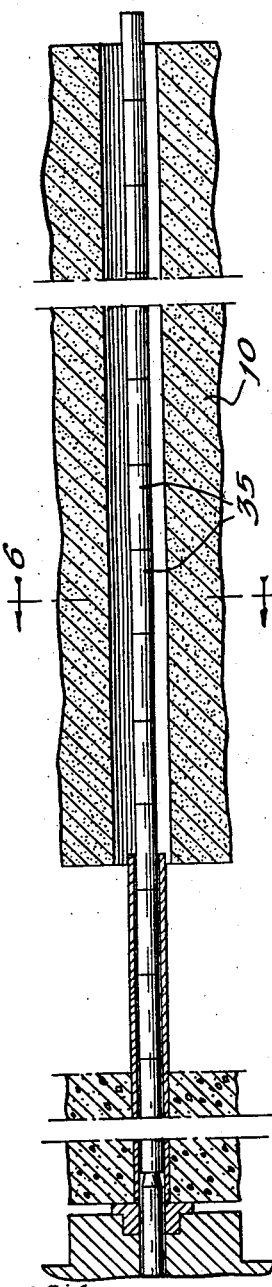
Fig. 5 is a longitudinal sectional view, partly in elevation, of a horizontal channel during a loading and unloading operation.
Figure 6:
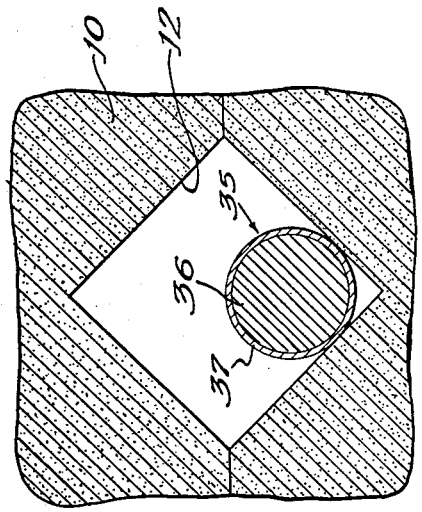
Fig. 6 is a view taken on line 6—6 of Fig. 5.

Such a structure broadly comprises a mass of graphite blocks closely piled or stacked into a cube 10 shown in Figs. 1 and 2. This graphite cube may be, for example, 28 feet on a side. It rests on a concrete foundation 11. The graphite cube 10 is pierced with horizontal air channels 12 of square cross-section, with one of the diagonals vertical, as shown in Fig. 6. The channels may be readily made by grooving adjacent blocks. The channels may be 1.75 inches on a side and extend completely through the reactor, from an inlet face 14 to an outlet face 15. About 2000 channels may be provided, and as will be later brought out, any unused channels can be plugged. Only a few of the channels are shown in the drawing for the sake of clarity.

Adjacent the inlet face 14 of the cube, the foundation is continued downwardly and outwardly to form the floor of an inlet air duct 16. The inlet air duct 16 is completed by concrete side walls 17 and top 19.

At some distance away from the graphite cube 10 the inlet duct is turned upwardly to terminate in an air filter 20, relatively close to the surface of the ground. A fan or blower 21, here illustrated as electrically driven, is installed on the floor of the inlet duct just below the air filter, access to the fan being conveniently obtained through duct door 22, behind the fan.

The concrete top 19 of the inlet air duct is continued upwardly as an inlet end shield 24, positioned parallel to but spaced away from inlet face 14 of the cube 10 to form an inlet chamber 25 communicating with the air channels 12.

Above the inlet chamber 25 and the cube 10 the concrete is continued horizontally to form a top shield 26, and side shields (not illustrated) are built up from the foundation 11 to enclose cube 10. The shields closely approach the top and side faces of the cube, to minimize air flow around the outside of the cube. A small amount of air circulation, however, may be desirable over the top and side faces to cool these faces.

At the outlet face 15, an outlet end shield 30 of concrete is provided. End shield 30 is parallel to and spaced from the outlet face 15 of the graphite cube to form an outlet chamber 31 communicating above with a stack 34 projecting upwardly and formed as a continuation of the concrete top, side, and outlet end shields. Thus the cube 10 is completely enclosed by concrete shields, with a duct system operating by virtue of pressure provided by fan 21 to conduct air from close to ground level through channels 12 into the stack and then into the atmosphere well above ground level at the top of the stack. The concrete shields may be from five to ten feet thick in accordance with the maximum desired operating power of the reactor and serve as shields to reduce escape of neutrons and gamma radiation.

As a neutronic reaction will take place when uranium bodies are properly spaced in a moderator mass of a certain finite size, the above-described device can be made chain reacting by placing uranium bodies in the horizontal channels in such a manner and in such an amount that a neutron reproduction ratio of slightly over unity is obtained, exclusive of all neutron losses within the reactor and to the exterior of the reactor.

Using the graphite mass as the moderator to slow fast neutrons to energies where they again are able to create fission in $92^{235}$, the device as described will have a reproduction ratio of unity when approximately 700 of the channels 12 in the graphite cube are each loaded with 68 aluminum jacketed uranium slugs 35 lying end to end, with a channel spacing of 7 inches measured center to center, and with the loaded channels roughly defining a cylindrical active portion. Both graphite and uranium should be of highest possible purity.

However, more than a unity reproduction ratio is required, as when the reproduction ratio is exactly unity no rise in neutron density will occur. Under such conditions the device will not develop high neutron densities or power in the form of heat. By loading additional channels, i.e., making the active portion greater than critical size, however, the reproduction ratio within the reactor can be brought above unity in order that a rise in density can occur. Then this excess neutron reproduction can be absorbed by neutron absorbing materials deliberately inserted into the reactor in order to hold the reproduction ratio at an average value of unity after a desired power output has been obtained, as a result of the initial rise in density.

Consequently, in accordance with the amount of excess reproduction ratio desired, about 1000 channels may be loaded with uranium slugs. Most of the channels not loaded with uranium may be closed by inserting plugs, preferably of graphite, in such channels in order to conserve air. Some of the channels however, in the peripheral portions of the cube may be left open for cooling of the graphite in those portions.

Figure 4:
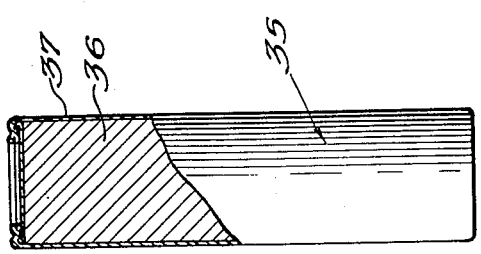
Fig. 4 is a longitudinal sectional view, partly in elevation, of a jacketed slug.

One preferred form of slug construction for rod geometry is shown in Fig. 4. In this case, each slug 35 comprises a uranium metal rod 36, 1.1 inches in diameter and 4 inches long covered with an aluminum jacket 37 approximately 20 mils thick in good heat conductive relation to the uranium. The slugs weigh about 2½ pounds each. The jacket 37 completely encloses and seals the uranium, preventing air or other cooling fluid from corroding the uranium and also preventing fission fragments created by nuclear fission at the surface of the uranium from entering the air stream.

The channels are loaded with uranium until the active portion is over critical size, for example to a size where the reproduction ratio, with neutron absorbers removed, is about 1.005. This geometry provides, with a channel spacing of about seven inches, a volume ratio of about 46 carbon to 1 uranium and a K factor for the rod lattice of about 1.06. As the K factor of 1.06 is reduced to a reproduction ratio of 1.005 by the reduction in size of the reactor from infinity to the operating size, the reproduction ratio of 1.005 means that for every two hundred neutrons starting in each neutron generation about two hundred and one neutrons can be produced in the operating reactor over and above all losses. Under these conditions and taking into account the fact that about one percent of the neutrons of fission are delayed in the emission for a mean time of about 5 seconds the neutron density of the reactor will double every 8 to 15 seconds. With some part of the control rod, which will be described later, inserted, but with the insertion of less than the amount of the control rod required to make the reproduction ratio unity, the rise is slower. When the control rod is almost, but not entirely inserted, a single doubling of the neutron density may take several hours. When a desired density has been reached, the reproduction ratio can be reduced to unity so that the desired density is continuously maintained by the neutron absorption in the inserted neutron absorbing material.

For such control of the reactor neutron absorbing material may be introduced into the reactor in the form of a control rod (not illustrated). This control rod extends into the graphite cube, sliding in a channel therein and is operated from outside of side shield as by rack and pinion. The rod is made from, or incorporates therein, an efficient neutron absorber, such as, for example, cadmium or boron. A sheet of cadmium riveted to a steel strip forms a satisfactory control rod. As the depth of insertion of the rod determines the amount of neutron absorbing material inside the reactor, the critical position of the rod is the point where the rate of neutron absorption by the rod balances the reproduction ratio at unity. Thus, by moving the rod outwardly from the critical position the neutron density in the reactor will rise. Moving the rod inwardly from the critical position causes the reproduction ratio to fall below unity, and the reaction stops, thus the reaction is always under control, and as the rise in neutron density is exceptionally slow as the rod approaches the critical position, manual control is possible. Other and similar rods may be provided, if desired, for rapid movement into the reactor to stop the reaction in case of failure of the control rod to stop the rise in neutron density for any reason. Such rods are termed safety rods. An ionization chamber may be used to indicate to the operator the neutron density of the reactor.

Figure 3:
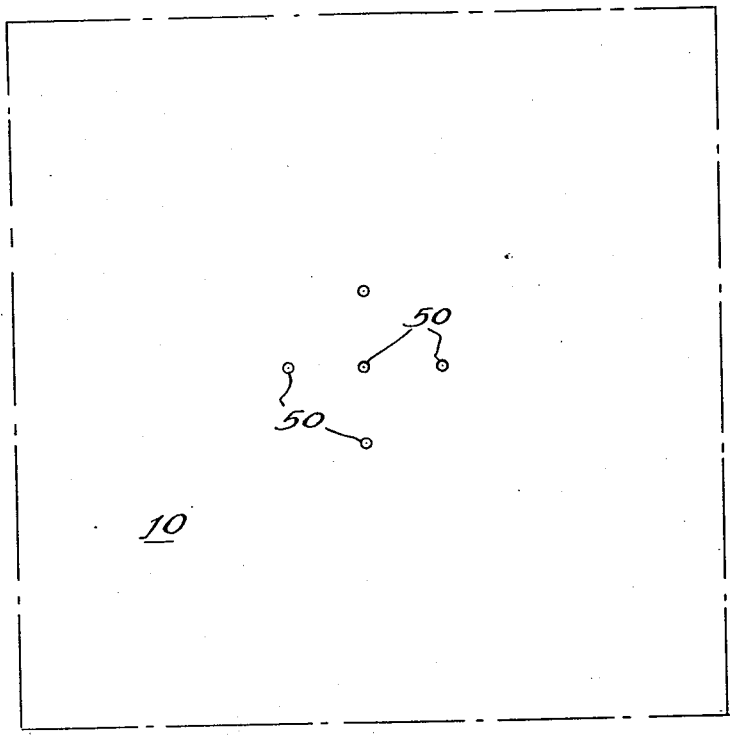
Fig. 3 is a schematic view of a horizontal cross-section of the reactor of Fig. 1, the disposition of impurity members being shown above the graph curves of Fig. 2 to indicate the relation between the shape of the curves and the disposition of the impurities.

In addition to the control and safety rods, other neutron absorbers are provided in order to control the neutron activity curve in accordance with the present invention. In the embodiment disclosed these absorbers take the form of rods 50. These rods 50 may be conveniently constructed of boron or cadmium enclosed in an aluminum or steel sheath. The rods 50 enter passages in the reactor which are positioned between the vertical rows of air channels 12 as shown in Fig. 3, and are to be inserted and withdrawn from the reactor by rack and pinions 51. Other well-known devices may be used to move the rods, if a more accurate control is desired.

In Figs. 2 and 3 five rods 50 are shown with four rods equally spaced from the rod located at the center of the active region of the reactor. The rods 50 are positioned in channels which extend from the top of the reactor between rows of air channels 12. By inserting a rod 50 into the reactor, the neutron density in the portion of the reactor controlled by said rod is lowered, because the rod absorbs neutrons so that said neutrons are removed from the chain reaction. Thus by adjusting the five rods 50 it is possible to flatten the peak of the neutron density curve any desired amount provided only that enough impurities are not placed in the reactor to stop the chain reaction entirely.

During operation heat is released in the reactor in accordance with the neutron density therein. Most of the heat arises from the kinetic energy of the fission fragments and about 92 percent of the energy is released in the uranium. About 6 percent is released in the graphite due to neutron absorption therein and about 2 percent escapes from the reactor in the form of neutrons and gamma radiation. Consequently, the reactor can only be operated at a power dependent upon heat removal to the point where a stable temperature obtains. Otherwise, the reactor will accumulate heat to the point that the device may be damaged.

A stable temperature is obtained in the device of the present invention by passing atmospheric air through the reactor, and in the specific example shown and described, the air is passed through the graphite channels and in direct contact with the aluminum jackets of the slugs. Under these circumstances the reactor can be operated continuously at 250 kilowatts electrical equivalent of heat by passing 32,000 cubic feet per minute through the reactor with a maximum temperature of the slugs of about 100° C., and at 500 kilowatts continuously with about 50,000 cubic feet per minute of air with a maximum metal temperature of 200° C. These heat maxima occur at the center of the reactor loaded as described, and total power output is determined by the maximum temperature permitted there unless the density curve is flattened by insertion of impurities as described or other means. Higher temperature maxima may be used, but what these temperatures will be will depend upon the heat conductivity of the uranium, the jacket and the jacket-uranium interface, and the cooling efficiency.

In the initial loading with uranium slugs 35 of the graphite cube 10, loading is started by filling the central air channel 12 with 68 slugs. Proceeding outwardly and preferably concentrically additional channels are loaded. The neutron activity increases as additional channels are loaded until the critical size of the reactor is reached when the reactor is capable of a chain reaction. The control rod is, however, inserted into the reactor to prevent the chain reaction, and additional channels are loaded until the desired maximum reproduction ratio of, for example, 1.005 to 1.006 is attained. Graphite plugs are then placed in the remaining empty air channels 12.

As the geometry of the disposition of the uranium in the moderator of the active portion of the reactor is uniform throughout in the loading above described, and if neutron absorbers are also uniformally distributed it follows that the K factor throughout the entire reactor is also uniform (provided all slugs are alike), leading to a reactor activity across the reactor having a distribution curve generally resembling a cosine curve as indicated by curve A in Fig. 2, which is a diagram in which the ratios of local neutron density to the average neutron densities are plotted for different radial distances from the center of the reactor.

Curve A is a centrally peaked curve, indicating that when the maximum slug temperature is set, say at 200° C., the total power at which the reactor can operate is limited by the central reactor activity required to bring the central slugs up to that temperature. It will be assumed that proper cooling obtains and that the 200° C. temperature is attained at a total power output of 500 k.w. It can also be assumed that the uniform geometry used provides a K factor of about 1.06 throughout the reactor to give a self-sustaining chain reaction in the reactor at the size described. Unless the temperature of the central uranium is permitted to rise, assuming maximum cooling, no more power can be obtained from the reactor under these conditions.

However, as has been noted, the impurities in all parts of the reactor and hence the K factor, do not need to be uniform, if the average K factor of the reactor is left sufficiently high that the critical size does not become too large or impractical. It has been found, if lattices having K factors that differ in the center of the reactor and in shells or zones surrounding the center are utilized, that when the reactor is assembled with the lattice having the K factor which is lower at the center than at an outer zone thereof, a reactor can be built wherein the reactor activity is no longer peaked, but is substantially flattened across a large portion of the reactor as shown in curve B, Fig. 2. This type of activity distribution may be so adjusted by setting rods 50 that the neutron reproduction ratio is substantially constant throughout the reactor or a major portion thereof. In such a case for the same total power output, neutron densities around the central slugs and consequently, the slug temperatures, will fall, and the temperatures of the slugs in the intermediate zones will more nearly approach those in the slugs in the center of the reactor. Under these conditions, the total power output of the reactor can then be raised, until the more widespread central neutron density is the same as when the activity follows curve A, and the central slugs are at the maximum permissible temperature again. If it is assumed that cooling is uniform throughout the reactor, more slugs than before will then be at or near maximum temperature and the total power output can be greatly increased.

Thus, a density curve resembling B may be attained merely by adjusting the positions of the absorbing rods 50. Thus, if the central rod 50, in relation to the transverse face of the reactor, is inserted deep into the reactor, and the outer rods inserted less deeply, the peak of curve A may be flattened until, it conforms to any desired curve, such as B. However, caution must be exercised that too much of rods 50 are not inserted so that the neutron reproduction ratio drops below 1, as in this case the chain reaction will stop. The amount of excess K factor available is the limiting factor. Methods of calculating the average K factor are set forth in the Fermi et al. application heretofore mentioned.

A method and means of improving the operation of a neutronic reactor have been described. While a horizontally loaded air-cooled, graphite-uranium reactor has been described, the invention is equally usable on other types of reactors.

Although the theories set forth are based on the best presently known experimental evidence, additional experimental data later discovered may modify said theories without detracting from the value of the teachings of the invention.

What is claimed is:

1. In the operation of a neutronic reactor having uranium bodies disposed in a neutron moderator, the method of flattening the neutron density distribution curve across the reactor comprising inserting a plurality of spaced neutron absorbing control members to varying depths in the central region closer to the center than to the periphery of the active portion of said reactor to provide a smaller neutron reproduction ratio in the region where the members are inserted than in the remainder of said reactor, thereby increasing the overall potential power output of the reactor.

2. In a neutronic reactor comprising a neutron moderator and a thermally fissionable isotope which yields neutrons upon fission, the amounts of each being in such proportion as to establish a self-sustaining neutron chain reaction and an average overall reproduction ratio above unity, an outer zone having a reproduction factor above unity, and a plurality of neutron absorbing control members inserted in an inner zone closer to the center than to the periphery of the active portion of said reactor to reduce the reproduction factor of said zone below that of said outer zone.

References Cited in the file of this patent

UNITED STATES PATENTS

| | | |
|---|---|---|
| 2,708,656 | Fermi et al. | May 17, 1955 |
| 2,736,696 | Wigner et al. | Feb. 28, 1956 |
| 2,781,308 | Creutz et al. | Feb. 12, 1957 |
| 2,798,847 | Fermi et al. | July 9, 1957 |

FOREIGN PATENTS

| | | |
|---|---|---|
| 114,150 | Australia | May 2, 1940 |
| 114,151 | Australia | May 3, 1940 |
| 233,011 | Switzerland | Oct. 2, 1944 |
| 861,390 | France | Oct. 28, 1940 |

OTHER REFERENCES

Smyth: "Atomic Energy for Military Purposes," pages 103, 104, 177–180, August 1945. Copy may be purchased from Supt. of Doc., Washington 25, D.C.

Kelly et al.: "Physical Review," 73, 1135–9 (1948).